US011986960B2

(12) United States Patent
Kupcsik et al.

(10) Patent No.: US 11,986,960 B2
(45) Date of Patent: May 21, 2024

(54) APPARATUS AND METHOD FOR TRAINING A MACHINE LEARNING MODEL TO RECOGNIZE AN OBJECT TOPOLOGY OF AN OBJECT FROM AN IMAGE OF THE OBJECT

(71) Applicant: Robert Bosch GmbH, Stuttgart (DE)

(72) Inventors: Andras Gabor Kupcsik, Boeblingen (DE); Marco Todescato, Stuttgart (DE); Markus Spies, Karlsruhe (DE); Nicolai Waniek, Dornstadt (DE); Philipp Christian Schillinger, Renningen (DE); Mathias Buerger, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 396 days.

(21) Appl. No.: 17/454,208

(22) Filed: Nov. 9, 2021

(65) Prior Publication Data
US 2022/0152818 A1     May 19, 2022

(30) Foreign Application Priority Data

Nov. 13, 2020     (DE) ..................... 10 2020 214 300.5

(51) Int. Cl.
*G06T 17/00* (2006.01)
*B25J 9/16* (2006.01)
(Continued)

(52) U.S. Cl.
CPC ............. *B25J 9/163* (2013.01); *B25J 9/1697* (2013.01); *G06F 18/214* (2023.01); *G06N 3/08* (2013.01);
(Continued)

(58) Field of Classification Search
CPC .......... G06N 20/00; G06T 2207/20081; G06T 17/00; G06T 7/75; G06T 17/20;
(Continued)

(56) References Cited

U.S. PATENT DOCUMENTS

2022/0398740 A1* 12/2022 Lenga ..................... G06V 10/82

OTHER PUBLICATIONS

Florence, et al.: "Self-Supervised Correspondence in Visuomotor Policy Learning," IEEE Robotics and Automation Letters, 5(2), (2019), pp. 492-499.

(Continued)

*Primary Examiner* — Matthew C Bella
*Assistant Examiner* — Dennis Rosario
(74) *Attorney, Agent, or Firm* — NORTON ROSE FULBRIGHT US LLP; Gerard A. Messina

(57) ABSTRACT

A method for training a machine learning model to recognize an object topology of an object from an image of the object. The method includes: obtaining a 3D model of the object; determining a descriptor component value for each vertex of the grid; generating training data image pairs each having a training input image and a target image. The target image is generated by determining the vertex positions in the training input image; assigning the descriptor component value determined for the vertex at the vertex position to the position in the target image; and adapting at least some of the descriptor component values assigned to the positions in the target image or adding descriptor component values to the positions of the target image.

17 Claims, 6 Drawing Sheets

(51) Int. Cl.
*G06F 18/214* (2023.01)
*G06N 3/08* (2023.01)
*G06T 7/13* (2017.01)
*G06T 7/70* (2017.01)
*G06V 10/46* (2022.01)
*G06V 20/10* (2022.01)

(52) U.S. Cl.
CPC .......... *G06T 7/13* (2017.01); *G06T 7/70* (2017.01); *G06T 17/00* (2013.01); *G06V 10/46* (2022.01); *G06V 20/10* (2022.01); *G05B 2219/40564* (2013.01)

(58) Field of Classification Search
CPC ... G06T 17/205; G06T 2200/04; G06T 19/00; G06T 19/003; G06T 19/20; G06T 7/149; G06T 7/344; G06T 7/251; G06V 20/64; G06V 20/647; G06V 20/653; G06V 10/763; G06V 10/751; G06V 10/70; G06V 10/74; G06V 10/75; G06V 10/752; G06V 10/757; G06V 10/758; G06V 10/759; G06V 10/46; G06V 10/476; G06V 2201/07; G06V 10/443; G06V 20/698; G06V 10/84; G06F 18/214; G06F 18/22; G06F 30/27; G06F 18/2321
See application file for complete search history.

(56) References Cited

OTHER PUBLICATIONS

Levine, et al.: "End-to-End Training of Deep Visuomotor Policies," J. Machine Learning Research, 17 (2016), pp. 1-40.

Park, et al.: "DeepSDF: Learning Continuous Signed Distance Functions for Shape Representation," arXiv:1901.05103v, (2019), pp. 1-19.

Florence et al., "Dense Object Nets: Learning Dense Visual Object Descriptors by and for Robotic Manipulation," Cornell University, 2018, pp. 1-12. https://arxiv.org/pdf/1806.08756.pdf> Nov. 9, 2021.

* cited by examiner

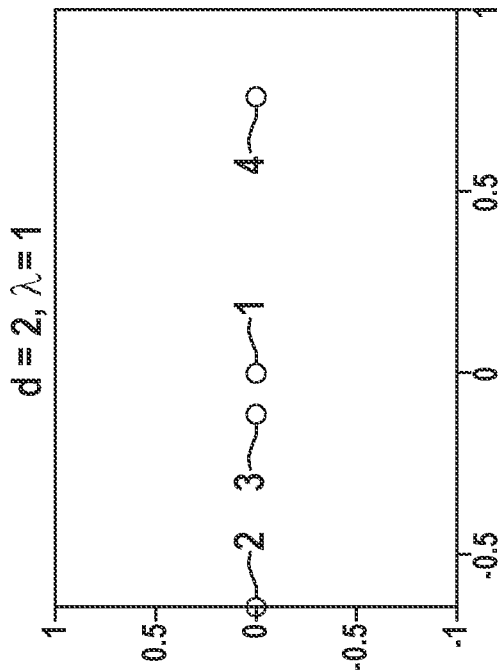
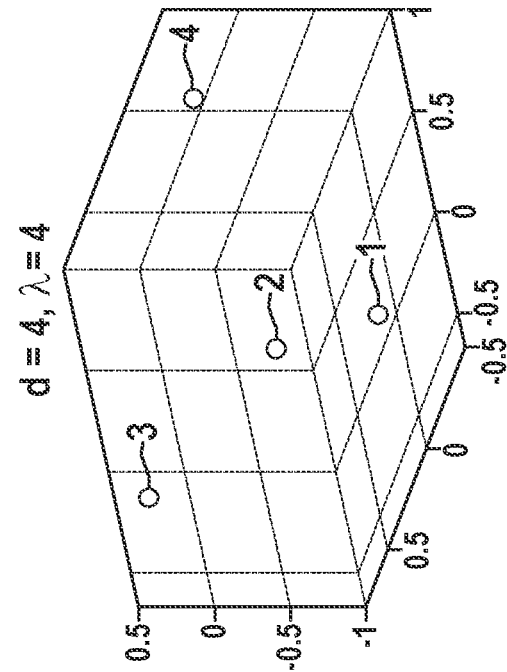
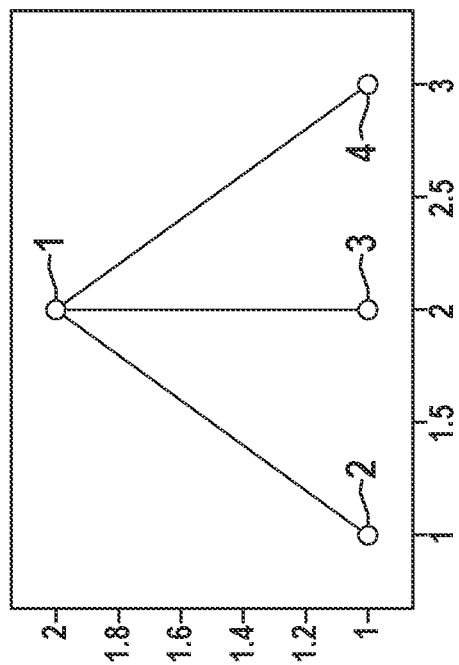
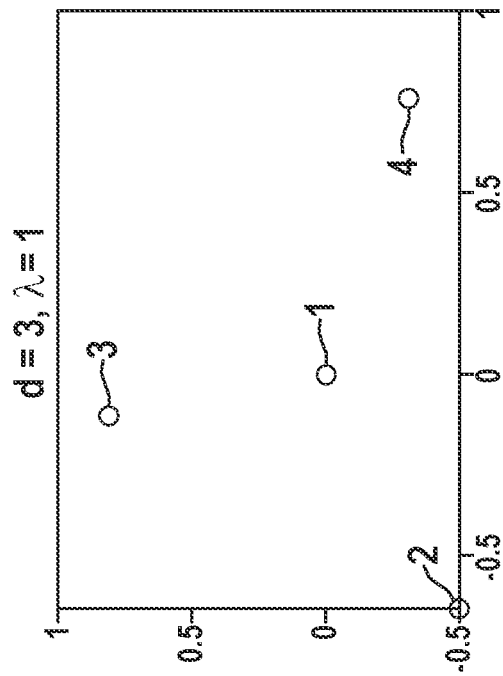
Fig. 3

APPARATUS AND METHOD FOR TRAINING A MACHINE LEARNING MODEL TO RECOGNIZE AN OBJECT TOPOLOGY OF AN OBJECT FROM AN IMAGE OF THE OBJECT

CROSS REFERENCE

The present application claims the benefit under 35 U.S.C. § 119 of German Patent Application No. DE 102020214300.5 filed on Nov. 13, 2020, which is expressly incorporated herein by reference in its entirety.

FIELD

The present disclosure relates to apparatuses and methods for training a machine learning model to recognize an object topology of an object from an image of the object.

BACKGROUND INFORMATION

In order to enable flexible production or processing of objects by a robot, it is desirable for the robot to be able to handle an object regardless of how the object is placed in the robot's working space. The robot should therefore be capable of recognizing which parts of the object are located at which positions, for instance so that it can grasp the object at the correct point, for example in order to attach it to another object or to weld the object at its present location. This means that the robot should be capable of recognizing the topology (surface) of the object, for instance from one or several images that are acquired by a camera mounted on the robot. One approach to achieving this involves determining descriptors, i.e., points (vectors) in a predefined descriptor space, for parts of the object (i.e., pixels of the object which are represented in an image plane), the robot being trained to assign the same descriptors to the same parts of an object irrespective of a current placement of the object.

The reference "Dense Object Nets: Learning Dense Visual Object Descriptors By and For Robotic Manipulation" by Peter Florence et al. (hereinafter referred to as "Reference 1") describes dense object nets that are models for self-monitored dense descriptor learning.

The effectiveness of the approach of Reference 1 is, however, greatly dependent on the quality of the collected training data and of the sensors involved, and the descriptors determined from self-monitored learning often lack explainability. Approaches that improve training for the recognition of object topology in this regard are accordingly desirable.

SUMMARY

In accordance with a variety of embodiments of the present invention, a method for training a machine learning model to recognize an object topology of an object from an image of the object is furnished, which method encompasses: obtaining a 3D model of the object, the 3D model encompassing a grid of vertices; determining a descriptor component value for each vertex of the grid; generating training data image pairs, each training data image pair encompassing a training input image showing the object, and a target image, and the generation of the target image encompassing the following: determining the vertex positions of vertices of the object model of the object which the vertices have in the training input image; assigning, for each determined vertex position in the training input image, the descriptor component value determined for the vertex at the vertex position to the position in the target image; and adapting at least some of the descriptor component values assigned to the positions in the target image or adding descriptor component values to the positions of the target image, so that descriptor component values that are assigned to positions inside the object and within a predefined spacing from the periphery of the object in the target image become adapted or added in such a way that they are located closer to descriptor component values that are assigned to positions outside the object than to descriptor component values that are assigned to positions in the interior of the object which are located farther than the predefined spacing from the periphery of the object. The method further encompasses training of the machine learning model by monitored learning using the training data image pairs as training data.

The result of adapting the descriptors in the interior of the object in the vicinity of the periphery (i.e., within the predefined spacing) toward the descriptors that occur in the background (i.e., outside the object) is that the edge of the object in the target image is less sharp, and the training is made robust with respect to errors in the training data, especially calibration errors of the camera for acquiring the training input images. This prevents the training from being negatively influenced in the situation in which the object position in a target image does not exactly match the object position in the acquired camera image (which serves as a pertinent training input image).

A variety of examples are indicated below.

Example 1 is the method as described above for training a machine learning model to recognize an object topology of an object from an image of the object.

Example 2 is the method of Example 1, encompassing determining a descriptor for each vertex of the grid, the descriptors being vectors that have one vector component for each of a plurality of channels, and descriptor component values of a channel being adapted so that descriptor component values of the channel which are assigned to positions inside the object and within a predefined spacing from the periphery of the object in the target image are adapted so that they are located closer to descriptor component values of the channel which are assigned to positions outside the object than to descriptor component values of the channel which are assigned to positions in the interior of the object which are located farther than the predefined spacing from the periphery of the object; and/or a channel having descriptor component values being added, so that descriptor component values of the added channel which are assigned to positions inside the object and within a predefined spacing from the periphery of the object in the target image are located closer to descriptor component values of the added channel which are assigned to positions outside the object than to descriptor component values of the added channel which are assigned to positions in the interior of the object which are located farther than the predefined spacing from the periphery of the object.

The target images can thus be images having several channels that contain the descriptor component values, and one or several channels can be adapted, or a channel can be added, in order to make the training of the machine learning model more robust with respect to calibration errors.

Example 3 is the method of Example 2, one channel of the plurality of channels being replaced by the added channel.

The result of replacing a channel rather than adding a channel is that the number of channels remains the same. The volume of training data is therefore not increased by the addition, and the dimension of the output of the machine learning model can remain unchanged.

Example 4 is the method of Example 2 or 3, the descriptor component values of the added channel being selected so that they change monotonically when positions are cycled through from a position outside the object to a position at the center of the object.

Graphically, in this example a mask is generated, descriptor component values being masked out more strongly the closer they are to the background, since with greater proximity to the periphery of the object (and thus to the background) there is an increasing risk that the descriptor component values will negatively influence the training of the machine learning model as a result of calibration errors. A mask of this kind can be generated in simple fashion using the 3D model (and the known position of the object in the target image), thereby enabling an improvement in training with little additional outlay.

Example 5 is the method of one of Examples 1 to 4, descriptor component values being adapted in such a way that descriptor component values that are assigned to positions within the predefined spacing inside the object, and descriptor component values that are assigned to positions outside the object, are equalized.

Graphically, in this example descriptor component values at the periphery of the object are blended with those of the background in order to prevent calibration errors from negatively influencing the training of the machine learning model. This can be done by simple automatic post-processing of the target images, thereby enabling an improvement in training with little additional outlay.

Example 6 is the process of one of Examples 1 to 5, the generating of the training data image pairs encompassing obtaining several images of the object with different placements, and generating a training data image pair from each obtained image by generating a target image for the obtained image.

This makes it possible to train the machine learning model (for instance, a robot having a robot control system that implements the machine learning model) to recognize the topology of an object regardless of the placement, for instance in the working space of the robot, of the object.

Example 7 is the method of one of Examples 1 to 6, encompassing determining the vertex positions of vertices of the object model of the object which the vertices have in the training input images, from the respective placements exhibited by the object in the training input images (e.g. in the camera coordinate system).

This makes possible an accurate determination of the vertex positions, which in turn makes possible accurate target images for monitored training.

Example 8 is the method according to one of Examples 1 to 7, the vertices of the 3D model being connected by edges, each edge having a weight that specifies the proximity of two vertices in the object which are connected by the edge; and the determining of a descriptor for each vertex of the grid being accomplished by searching for descriptors for the vertices which minimize the sum, over pairs of connected vertices, of distances between the descriptors of the pair of vertices, weighted by the weight of the edge between the pair of vertices.

This procedure allows a machine learning model (such as a neural network) to be trained to carry out a more accurate prediction (i.e., a descriptor determination) as compared with the use of self-monitored learning (i.e., enables a greater variety of applications of the network). It furthermore furnishes greater flexibility for adapting the machine learning model so that it can be applied to a variety of problems, reduces the training data requirements (e.g., the volume of training data required), and produces an explainable machine learning aid.

Example 9 is the method of Example 8, the searching for the descriptors encompassing: determining eigenvectors of the Laplacian matrix of the graph constituted by the vertices and edges of the 3D model; and assuming components of the eigenvectors as descriptor component values.

This makes possible an efficient determination of (almost) optimal descriptors. For example, each descriptor is a vector having the dimension d, and thus has d components (for instance, (3, 4) is a vector having dimension 2, and has components 3 and 4).

Example 10 is the method of Example 9, encompassing: associating each vertex with a component position in the eigenvectors; and assuming, for each vertex, the components in the eigenvectors at the component position associated with the vertex as descriptor component values for the vertex.

In particular, the descriptor space dimension can be flexibly selected by selecting a number of eigenvector components for a descriptor corresponding to a desired descriptor space dimension.

Example 11 is the method of Example 10, the determining of the descriptors further encompassing compressing components of eigenvectors whose eigenvalues differ by less than a predetermined threshold into a single component.

This makes possible a reduction in the descriptor space dimension if the object is symmetrical. In other words, an unnecessary differentiation between symmetrical parts of the object can be avoided.

Example 12 is the method of one of Examples 1 to 11, the obtaining of the 3D model of the object encompassing: obtaining a 3D grid of vertices and edges that model the object; and assigning, as weights for the edges, the edge weights of a Laplace-Beltrami operator that is applied to the grid.

By using this approach it is possible to take into account the geometry of the model if the proximity of two vertices is determined by assuming the geodetic distance on the object rather than the Euclidian metric in a surrounding space, which can be inexact if the object is curved.

Example 13 is a method for controlling a robot which encompasses: training a machine learning model in accordance with one of Examples 1 to 12; obtaining an image showing the object; introducing the image into the machine learning model; determining a placement of the object from the output of the machine learning model; and controlling the robot depending on the determined placement of the object.

Example 14 is the method of Example 13, the determining of the object placement encompassing determining the position of a certain part of the object; and the controlling of the robot depending on the determined placement of the object encompassing controlling an end effector of the robot, moving to the position of the part of the object, and interacting with the part of the object.

Example 15 is a software or hardware agent, in particular a robot, which encompasses: a camera that is designed to furnish image data of an object; a control system that is designed to implement a machine learning model; and a training apparatus that is designed to train the machine learning model by way of the method of one of Examples 1 to 12.

Example 16 is a software or hardware agent according to Example 15 which encompasses at least one actuator, the control system being designed to control the at least one actuator using an output from the machine learning model.

Example 17 is a computer program that encompasses instructions which, upon execution by a processor, cause the processor to carry out a method according to one of Examples 1 to 14.

Example 18 is a computer-readable medium that stores instructions which, upon execution by a processor, cause the processor to carry out a method according to one of Examples 1 to 14.

In the figures, similar reference characters generally refer to the same parts throughout the various views. The figures are not necessarily accurately to scale; emphasis is instead placed in general on illustrating the features of the present invention. In the description below, various aspects of the present invention are described with reference to the figures.

BRIEF DESCRIPTION OF THE DRAWINGS

FIG. 3 shows an exemplifying embedding of a four-node graph for descriptor determination, in accordance with the present invention.

DETAILED DESCRIPTION OF EXAMPLE EMBODIMENT

The comprehensive description that follows refers to the figures, which illustratively show specific details and aspects of this disclosure in which the present invention can be implemented. Other aspects can be used, and structural, logical, and electrical modifications can be made, without deviating from the scope of the present invention. The various aspects of this disclosure are not necessarily mutually exclusive, since some aspects of this disclosure can be combined with one or several other aspects of this disclosure in order to constitute new aspects.

A variety of examples are more comprehensively described below.

Figure 1:
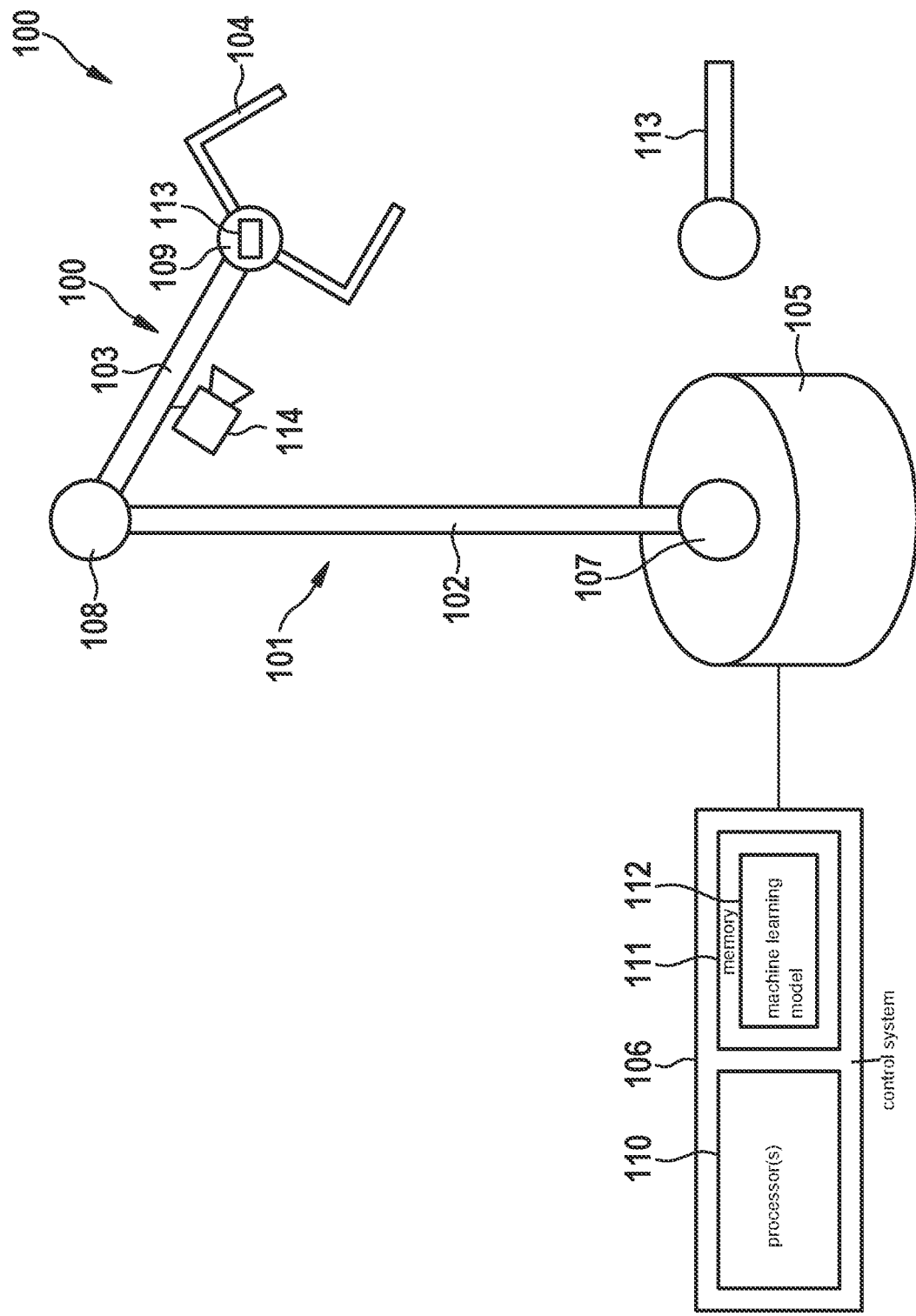
FIG. 1 shows a robot in accordance with an example embodiment of the present invention.

FIG. 1 shows a robot 100.

Robot 100 contains a robot arm 101, for instance an industrial robot arm for handling or assembling a workpiece (or one or several other objects). Robot arm 101 contains manipulators 102, 103, 104 and a base (or support) 105 by way of which manipulators 102, 103, 104 are supported. The expression "manipulator" refers to the movable components of robot arm 101 whose actuation makes possible a physical interaction with the environment, for instance in order to perform a task. For control, robot 100 contains a (robot) control system 106 that is designed to implement the interaction with the environment in accordance with a control program. The last component 104 (which is farthest away from support 105) of manipulators 102, 103, 104 is also referred to as "end effector" 104 and can contain one or several tools, for example a welding torch, a grasping instrument, a painting device, or the like.

The other manipulators 102, 103 (which are located closer to support 105) can constitute a positioning apparatus, so that, together with end effector 104, robot arm 101 having end effector 104 at its end is furnished. Robot arm 101 is a mechanical arm that can furnish functions similar to those of a human arm (possibly having a tool at its end).

Robot arm 101 can contain joint elements 107, 108, 109 that connect manipulators 102, 103, 104 to one another and to support 105. A joint element 107, 108, 109 can have one or several joints that can each furnish a rotatable motion (i.e. rotary motion) and/or translational motion (i.e. displacement) relative to one another for associated manipulators. The motion of manipulators 102, 103, 104 can be initiated by way of actuators that are controlled by control system 106.

The term "actuator" can be understood to mean a component that is embodied to effect a mechanism or process as a reaction to being driven. The actuator can implement instructions prepared by control system 106 ("activation") as mechanical motions. The actuator, for instance an electromechanical converter, can be designed to convert electrical energy into mechanical energy in reaction to being driven.

The term "control system" can be understood as any type of logic-implementing entity that, for instance, can contain a circuit and/or a processor that is capable of executing software, firmware, or a combination thereof stored in a storage medium, and can output instructions, for instance to an actuator in the present example. The control system can be configured, for instance using program code (e.g. software), to control the operation of a system (in the present example, a robot).

In the present example, control system 106 contains one or several processors 110 and a memory 111 that stores code and data on the basis of which processor 110 controls robot arm 101. In accordance with various embodiments, control system 106 controls robot arm 101 on the basis of a machine learning model 112 that is stored in memory 111.

According to various embodiments of the present invention, machine learning model 112 is designed and trained to enable robot 100 to recognize an object 113 that is placed, for instance, in a working space of robot arm 101. For example, the robot can decide what is to be done with object 113 depending on what kind of object it is (e.g. the object type), or can also recognize and decide which part of object 113 should be grasped by end effector 109. Robot 100 can be equipped, for instance, with one or several cameras 114 that allow it to acquire images of its working space. Camera 114 is mounted, for instance, on robot arm 101, so that the robot can acquire images of object 113 from various perspectives by moving robot arm 101 around.

One example of a machine learning model 112 for object recognition is a dense object net. A dense object net maps an image (e.g. an RGB image furnished by camera 114) onto a descriptor space image of any dimension (dimension D), as described in Reference 1.

The dense object net is a neural network that is trained, using self-monitored learning, to output a descriptor space image for an input image of an image. The effectiveness of this approach is highly dependent, however, on the quality of the collected training data and of the sensors involved (e.g. camera 114), in particular their calibration accuracy. It can furthermore be difficult to interpret the network prediction.

In accordance with various embodiments of the present invention, an approach to recognizing an object and its placement is furnished, on the assumption that a 3D model (e.g. a computer-aided design (CAD) model) of the object is known, which is typically the case for industrial assembly or processing tasks. It is also possible to acquire RGBD (RGB+ depth information) images of an object and to determine from them a 3D model for the object.

In accordance with various embodiments, nonlinear dimensionality reduction techniques are used to calculate optimum target images for training input images for a neural network. Monitored training of a neural network is thus used instead of self-monitored training of a neural network.

In accordance with an embodiment, firstly a data collection is carried out in order to generate training data for training machine learning model 112. In particular, for instance, registered RGB (red-green-blue) images are collected. A "registered image" means here an RGB image having known intrinsic and extrinsic camera values. In a real-world scenario a camera 114 mounted on a robot (for instance a camera mounted on a robot wrist) is used, for instance, to scan an object while the robot (e.g. robot arm 101) moves around. Other extrinsic estimation techniques, for instance ChArUco markers, can be used, i.e. an object can be placed at various positions and placements relative to a ChArUco board, and images of the assemblage (of ChArUco board and object) are acquired. In a simulated scenario, photorealistically generated RGB images utilizing known object placements are used.

After the RGB images are collected, target images for the RGB images are rendered for monitored training of a neural network.

It is assumed that the placement of each object in global coordinates in each collected RGB image is known. This is uncomplicated for a simulated scenario, but requires manual matching for a real-world scenario, for instance placing the object at predefined positions. RGBD images can also be used to determine the position of an object.

With this information and using a vertex descriptor calculation technique, for example as described below, for each RGB image (i.e. training input image) a descriptor image (i.e. training output image, also referred to as a "target image" or "ground truth image") is rendered.

Figure 2:
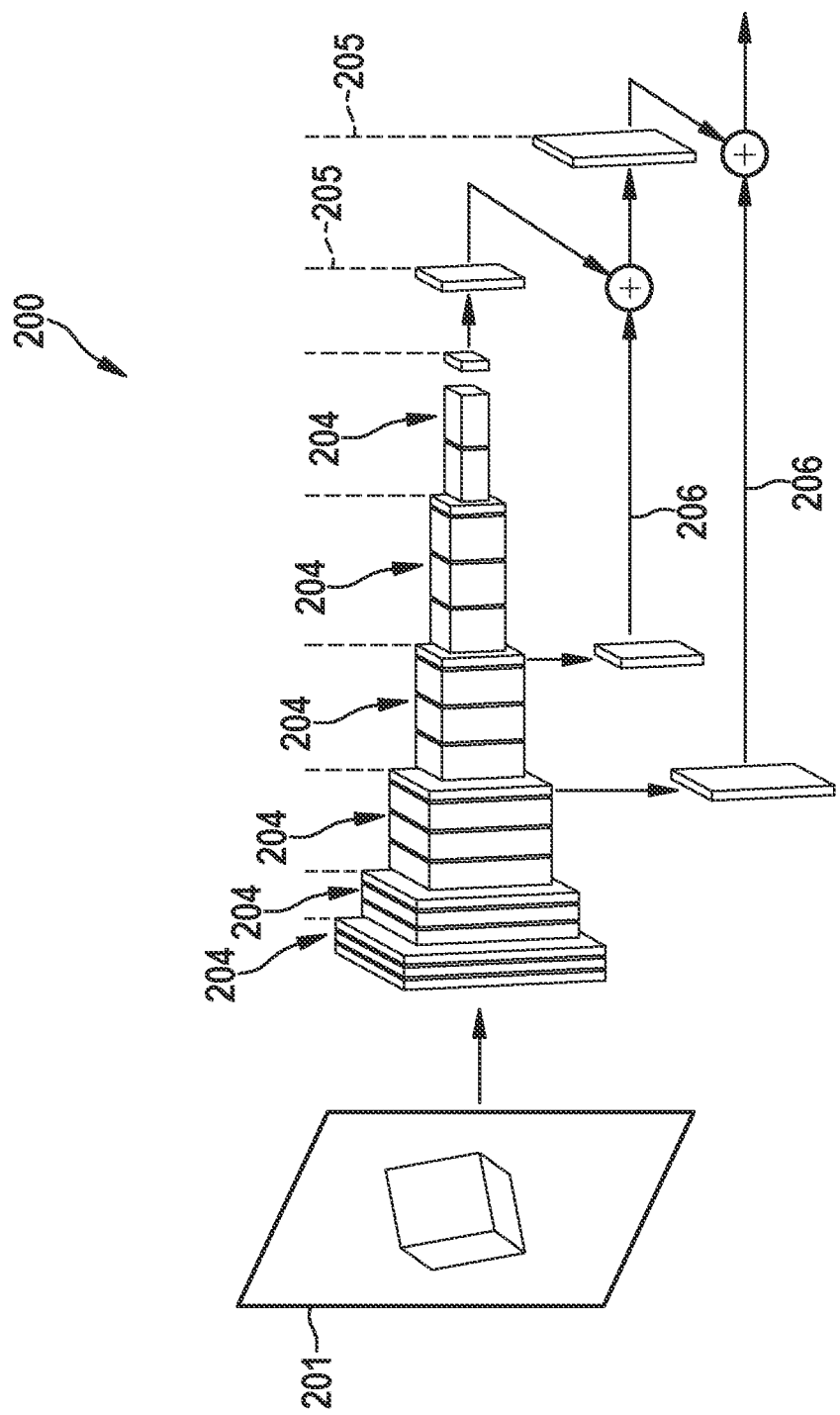
FIG. 2 illustrates the training of a neural network, in accordance with an example embodiment of the present invention.

When a target image has been generated for each RGB image, i.e. when pairs of RGB images and target images have been created, these pairs of a training input image and associated target image can be used as training data for training a neural network, as illustrated in FIG. 2.

FIG. 2 illustrates the training of a neural network 200, in accordance with an embodiment.

Neural network 200 is a fully convolutional network that maps an h×w×3 tensor (input image) onto an h×w×D tensor (output image).

It encompasses several stages 204 of convolution layers, followed by a pooling layer, upsampling layers 205, and skip connections 206, in order to combine the outputs of different layers.

For training, neural network 200 receives a training input image 201 and outputs an output image 202 having pixel values in the descriptor space (e.g. color components in accordance with descriptor vector components). A training loss between output image 202 and target image 203 associated with the training input image is calculated. This can take place for a stack of training input images and the training loss can be averaged over the training input images, and the weights of neural network 200 are trained using a stochastic gradient descent using the training loss. The training loss calculated between output image 202 and target image 203 is, for instance, an L2 loss function (in order to minimize a pixel-wise least-square error between target image 203 and output image 202).

Training input image 201 shows an object, and the target image and the output image contain vectors in the descriptor space. The vectors in the descriptor space can be mapped onto colors, so that output image 202 (as well as target image 203) resembles a heat map of the object.

The vectors in the descriptor space (also referred to as "(dense) descriptors") are d-dimensional vectors (for instance, d is equal to 1, 2, or 3) that are assigned to each pixel in the respective image (for instance, to each pixel of input image 201, on the assumption that input image 201 and output image 202 have the same dimension). The dense descriptors implicitly encode the surface topology of the object shown in input image 201, invariantly with respect to its placement or the camera position.

If a 3D model of the object exists, it is possible to analytically determine an optimal (in the Riemannian sense) and unique descriptor vector for each vertex of the 3D model of the object. In accordance with various embodiments, target images for registered RGB images are generated using these optimal descriptors (or estimates of these descriptors which are determined by optimization), resulting in fully monitored training of neural network 200. In addition, the descriptor space is explainable and optimal regardless of the descriptor dimension d selected.

The 3D models will be regarded hereinafter as Riemannian manifolds $\mathcal{M}$ embedded in $\mathbb{R}^3$, which produces a calculation of geodetics (shortest path between vertices) while the geometry is taken into account. An optimal surface topology can be explicitly encoded by embedding the 3D model in a d-dimensional Euclidean descriptor space, so that geodetic distances between adjacent vertices are preserved as much as possible. This Euclidean space is regarded as the descriptor space, and a search for the optimal mapping $f: \mathcal{M} \to \mathbb{R}^d$ is carried out. In accordance with an embodiment, the Laplacian operator calculation for grids and its eigenvalue decomposition are used to determine (or at least estimate) the optimal embedding of vertices in the descriptor space. Thus, instead of separating geodetic calculation and mapping optimization, the descriptors are extracted in a single framework by calculating the Laplacian operator in the 3D model.

In accordance with the approach described below, the embedding of a 3D object model in the Euclidean space into the descriptor space is intended to preserve distances (e.g. geodetic distances) between vertices.

For dimensionality reduction via the Laplacian operator, let a set of points $\{x_i\}_{i=1}^N$, $x \in \mathbb{R}^D$ correspond to nodes in an undirected graph. Let $w_{ij} \geq 0$ refer to the connection strength or proximity between two nodes $x_i$ and $x_j$, for example $w_{ij} = \exp(-\|x_i - x_j\|_2)$.

The objective is to find a d-dimensional embedding $\{y_i\}_{i=1}^N$, $y \in \mathbb{R}^d$ (typically d<D) so that if $x_i$ and $x_j$ are close together, their embedding should also be close:

$$Y^* = \underset{Y}{\arg\min} \frac{1}{2} \sum_{j=1}^{N} \sum_{i=1}^{N} w_{ij} \|y_i - y_j\|_2, \quad (1)$$

where $Y = [y_1, \ldots, y_N]_{d \times N}$.

The optimization problem (1) is equivalent to $$Y^* = \underset{Y}{\mathrm{argmin}}\, Tr(YLY^T),\ L = D - A, \qquad (2)$$

where $L_{N \times N}$ is the positive semidefinite Laplacian matrix. A is the adjacency matrix having elements $A_{ij} = A_{ji} = w_{ij}$ and $D_{ij} = \Sigma_j A_{ij}$. Note that the optimal solution $Y^*$ can have any scaling and trend. In order to remove this randomness, the weighted second moment can be normalized with $Y^T DY = I$, which forces a unit variance in different dimensions. The resulting optimization problem then becomes:

$$Y^* = \underset{Y}{\mathrm{argmin}}\, Tr(YLY^T), \qquad (3)$$
$$\text{s.t. } YDY^T = I$$

using limited optimization with Lagrangian parameters $\lambda \in \mathbb{R}^d$ $$\mathscr{J}(Y, \lambda) = Tr(YLY^T) - Tr(\mathrm{diag}(\lambda)(YDY^T - I)), \qquad (4)$$
$$\frac{\partial \mathscr{J}(Y, \lambda)}{\partial Y} = 2LY^T - 2\mathrm{diag}(\lambda)DY^T,$$
$$LY^T = \mathrm{diag}(\lambda)DY^T,$$

which is a generalized eigenvalue problem that can be solved using standard linear algebra libraries. Because L and D are positive (semi)definite matrices, the eigenvalues can be written as $\lambda_0 = 0 \leq \lambda_1 \leq \ldots \leq \lambda_{N-1}$.

In addition, the first eigenvector (first column of $Y^T$) is equal to 1 (vector having only ones), which is a trivial solution that maps each vertex onto one point. In addition, any two eigenvectors are orthogonal to one another. The solution to the eigenvalue problem yields N eigenvalues and corresponding eigenvectors having a dimensionality N. In practice, however, only the first d eigenvectors, corresponding to the lowest eigenvalues (except for the trivial solution) are used.

The i-th column of Y is thus the embedding of the node i in $R^d$, while each row represents the embedding of each point in different orthogonal dimensions.

FIG. 3 shows an exemplifying embedding of a 4-node graph.

The eigenvalues have an important significance in terms of the optimality of the embedding. In the case of an optimal embedding $Y^*$, the limitation $Y^* DY^{*T} = I$ is satisfied and therefore $$Y^* L Y^{*T} = \mathrm{diag}(\lambda), \qquad (5)$$

i.e. the eigenvalues correspond to the embedding errors in different dimensions. For simplicity, let d=1, in which case each x is mapped onto point y=1. In this case equation (5) becomes simplified to:

$$\hat{y}^T L \hat{y} = \lambda_0,\ \hat{y} = [y_1, \ldots, y_N]^T = 1^T. \qquad (6)$$

Because $\lambda_0 = 0$, this means that if all the vertices of the object are mapped onto one point, the embedding error is equal to 0, since the distance between all points y is equal to 0. This is not useful for practical purposes, and the first eigenvalue and eigenvector are therefore omitted. Using d=2 corresponds to mapping each point x onto a line, and $\lambda 1$ is the corresponding embedding error, and so forth. Because the eigenvectors are orthogonal to one another, the increase in d will add new dimensions to the embedding, the purpose being to minimize the errors in the new, orthogonal dimension. The same effect can be seen in (3): because $Tr(YLY^T) = \Sigma_{i=1}^d \lambda_i$, the original objective can be implemented in order to minimize the embedding errors in each dimension. The resulting descriptor vector is thus optimal regardless of the d selected.

In some cases, subsequent eigenvalues are identical, i.e. $\lambda_i = \lambda_{i+1} = \lambda_{i+2} = \ldots$ (see the example of FIG. 3, in which the eigenvalues for d=2 and d=3 are the same). This provides some information regarding symmetry, there being several orthogonal dimensions having an identical embedding error. In actuality, in the 4-node graph example of FIG. 3, if the graph is fully connected the embedding is symmetrical in every dimension and all the eigenvalues are identical, with the exception of the trivial solution.

The graph embedding approach described above can be applied directly to grids, point clouds, etc. For example, the k-nearest neighbors (k-NN) algorithm can be used to produce local connections between vertices and create the adjacency matrix. This approach is sufficient for creating the graph Laplacian operator and calculating the embedding of each vertex. This approach is nevertheless built inherently on a Euclidean distance metric and heuristics, which do not necessarily take into account the underlying Riemannian geometry of the 3D object model. For example, some edges may run through the object, or can connect non-adjacent vertices of the grid. Even just a few incorrect entries in the adjacency matrix can result in poor embedding performance. In accordance with an embodiment, when models are being worked with there is therefore assurance that geodetic distances between any two vertices are correct or exhibit a minimal approximation error.

In general, object models such as grids or point clouds can be represented as Riemannian manifolds embedded in $\mathbb{R}^3$. A Riemannian manifold M having a uniformly changing metric g can be regarded as "locally Euclidean," which captures the property of local smoothness of objects in the real world. The generalization of the Laplacian operator to Riemannian manifolds is the Laplace-Beltrami (LB) operator $\Delta$. Similarly to the Laplacian operator in Euclidean spaces, the LB operator applied to a function is the divergence of the gradient of the function. While the Laplacian operator is easy to calculate for graphs and in Euclidean spaces (based on either adjacency information or finite differences), the LB operator in differential geometry is constructed on exterior calculus, and is generally not easily accessible for a manifold.

The LB operator can, however, be approximated for known discrete manifolds such as grids. This offers a highly efficient and simple calculation framework when working with grids, point clouds, etc. Because the Riemannian equivalent of the Laplacian operator is the Laplace-Beltrami operator, the embedding approach described above can be applied directly to $\Delta$. The eigenvectors Y of $\Delta$ will represent the optimal d-dimensional Euclidean embedding of the vertices of the grid.

$\Delta$ can be efficiently calculated for grids as follows. Assume the existence of a grid having N vertices V, surfaces F, and edges E. In this case the value of $\Delta$ is N×N. The i-th row of $\Delta$ describes the adjacency information of the i-th vertex with respect to its connecting vertices. Let $\varphi$ be any function on the grid. The application of the discrete LB operator in the context of this function is then mapped onto $\Delta\varphi$. The i-th element of this function can be described as follows:

$$(\Delta\phi)_i = \frac{1}{2}\sum_{ij\in E}(\cot(\theta_k^{ij}) + \cot(\theta_l^{ji}))(\phi_j - \phi_i), \quad (7)$$

Figure 4:
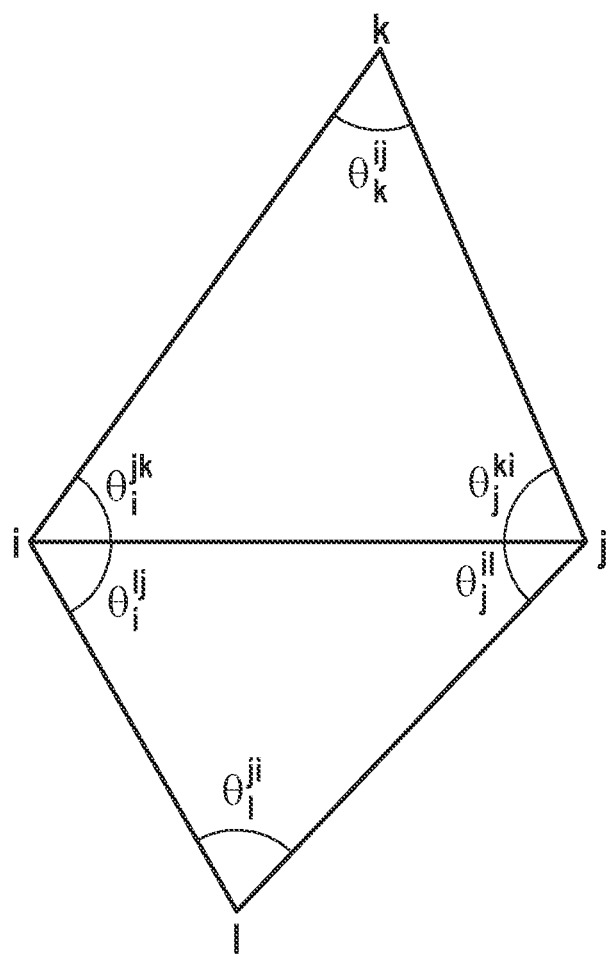
FIG. 4 illustrates the definition of angles at vertices of a 3D model for edge determination in accordance with the Laplace-Beltrami operator, in accordance with an example embodiment of the present invention.

FIG. 4 describes the definition of angles $\theta_k^{ij}$ and $\theta_l^{ji}$.

The sum of the cotangent expressions $\cot(\theta_k^{ij})+\cot(\theta_l^{ji})$ acts as the connection weight $w_{ij}$. In accordance with an embodiment, these weights occurring in (7), i.e. the weights of the LB operator when applied to the grid, are used as the weights for determining D and A of equation (2).

Note that because $\alpha > \pi/2 \Rightarrow \cot(\alpha) < 0$, negative connection weights $w_{ij}$ can occur especially when one angle is considerably larger than the others (not good surfaces). To overcome this problem, the connection weight can be approximated by edge flipping.

The descriptor generation approach described above deals with each vertex uniquely. In other words, a unique descriptor is assigned to each vertex. Objects can be symmetrical, however, and the assignment of unique descriptors to apparently identical vertices will thus result in asymmetrical embeddings.

To address this problem, according to various embodiments intrinsic symmetries of forms are detected and symmetrical embeddings are compressed, so that symmetrical vertices are mapped onto the same descriptor. It can be shown that a shape possesses intrinsic symmetry if the eigenfunctions of the Laplace-Beltrami operator appear symmetrical in the Euclidean space. In other words, symmetrical features of a grid, a point cloud, etc. are detected when their geodetic-preserving Euclidean embedding (descriptor space) exhibits Euclidean symmetry. A compact manifold has intrinsic symmetry if a homeomorphism T that preserves geodetic distances between each vertex of the manifold exists.

So-called "global intrinsic symmetry invariant functions" (GISIFs) can be used to compress the symmetrical descriptors. Assuming a global intrinsic symmetrical homeomorphism $T: \mathcal{M} \to \mathcal{M}$, s.t. $g(p,q)=g(T(p), T(q))$ $\forall p,q \in \mathcal{M}$, where g represents geodetic distance, and a function f on the manifold, if $$f \circ T(p) = f(T(p)) = f(p), \quad (8)$$

is true for every point p on the manifold, f is then a GISIF. On a torus, for example, this homeomorphism will be any rotation around the Z axis. This means that if f is a GISIF, it must be invariant with respect to that rotation.

It can further be shown that in the case of identical eigenvalues $\lambda_i = \lambda_{i+1} = \ldots = \lambda_{i+N}$, a GISIF of this kind is the square of the sum of the eigenvector components of the point, i.e.:

$$f(p) = \sum_i^{i+N} \varphi_i(p)^2.$$

This is consistent with the above analysis of identical eigenvalues, which is the necessary condition for symmetrical embedding. Because identical eigenvalues seldom exist in practice because of numerical limitations, it is possible to use here a heuristic in which eigenvalues are regarded as identical if they are located within the same $\varepsilon$-sphere (for a small value of $\varepsilon$), i.e. if they differ by less than a predetermined threshold, for instance 0.1% or 0.01%. Because symmetrical dimensions need to be found only once for a given object, this can be performed manually.

For example, let the first seven eigenvalues of an eigenvalue decomposition for a torus be as follows:

$$\lambda_{0-6}=[0.0, 0.0175, 0.0175, 0.069, 0.069, 0.1525, 0.1525]$$

A GISIF embedding in $\mathbb{R}^3$—without considering the trivial solution—is then described by $$f(p)=[\phi_1(p)^2+\phi_2(p)^2, \phi_3(p)^2+\phi_4(p)^2, \phi_5(p)^2+\phi_6(p)^2].$$

In the case of multiple objects, this can be represented as multiple separate connected graphs. In this case the adjacency matrix is block diagonal. The symmetrical positive definite Laplacian operator will once again have orthogonal eigenvectors. There are two differences in the result of the eigenvalue decomposition compared with the case with individual graph embedding: firstly, the non-decreasing eigenvalues become the embedding errors of all objects without order. Secondly, the eigenvectors will have null entries, since the corresponding eigenvalues remain orthogonal. This means that each dimension of the descriptor space will correspond to only one object embedding. In addition, the dimensions are ordered with reference to the embedding errors of the corresponding object. If a three-dimensional embedding of two objects is to be generated, d=8 will therefore be used, since there are two trivial solutions corresponding to $\lambda=0$.

This uncomplicated approach handles multiple objects independently, while there can be suboptimal methods, which nevertheless furnish very good embeddings with a lower d, which use the correlation between objects.

With regard to the placements of objects, the target images can be generated by projecting the descriptors onto the image plane. Random descriptor space image noise, or an individual descriptor that is mapped onto the farthest distant point in the descriptor space, can be used as a non-object (background).

Image augmentation methods such as domain randomization, or interference such as Gaussian blur, cropping, or dropout, can be used to improve the robustness of the trained network 200.

In the examples described above, a target image is generated by mapping descriptors that are associated with vertices onto the positions in the target image that the vertices have in the target input image. This target image, thereby generated geometrically, will also be referred to hereinafter as a "geometric (descriptor) target image."

In accordance with a variety of embodiments, in addition to the geometric target images, target images having view-dependent descriptors are also generated and are used for training (alone or together with the geometric target images.)

Figure 5:
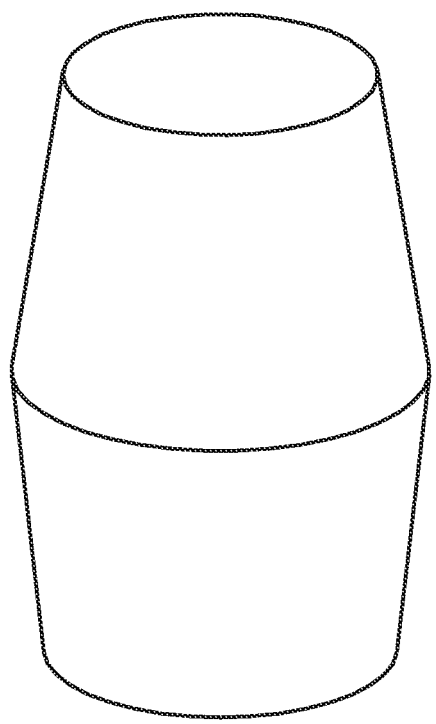
FIG. 5 shows a geometric training target image generated in accordance with an embodiment of the present invention.

FIG. 5 shows a geometric target image.

Figure 6:
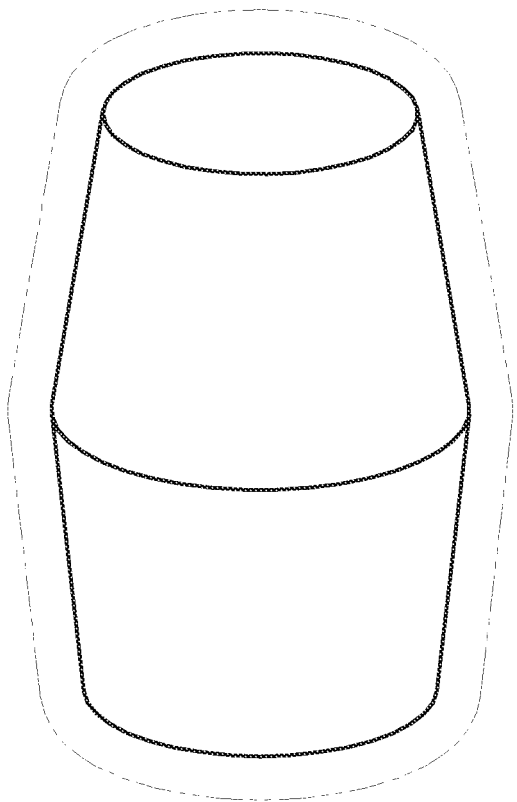
FIG. 6 shows a view-dependent training target image generated with respect to the training target image of FIG. 5, in accordance with a first variant of the present invention.

FIG. 6 shows a view-dependent target image, generated with respect to the geometric target image of FIG. 5, in which a peripheral region of the object (as depicted in the image) is blended with the background, i.e. (optically) equalized, for instance in the manner of a blurring or unsharpening operation.

The result is to equalize descriptor component values (for instance, of each color channel) in a peripheral region of the object (e.g. at positions in the interior of the object and within a specific spacing from the periphery of the object) with the descriptor component values of the background of the target image (in which context the background can also have only a single descriptor component value). The result, graphically, is to generate descriptors in the target image which imitate a view-dependent edge detection descriptor that separates object and background.

Figure 7:
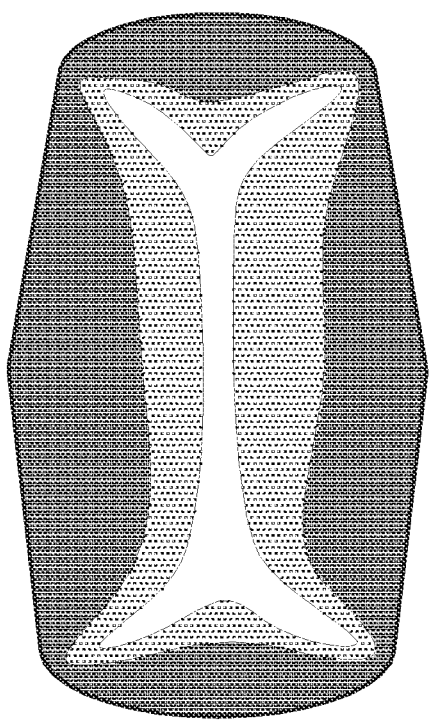
FIG. 7 shows a channel of a view-dependent training target image generated with respect to the geometric target image of FIG. 5, in accordance with a second variant of the present invention.

FIG. 7 shows one channel of a view-dependent target image, generated with respect to the target image of FIG. 5, in which a descriptor component serves as an object mask.

In this example, one color channel (e.g. the B channel of an RGB image) serves as a mask, the interior of the object being emphasized with respect to the peripheral region of the object, i.e. the descriptor component values at positions that are located farther away from the periphery differ more greatly from the background than those that are located closer to the periphery. It is also possible simply to [sic][1] descriptor component values of a channel at positions that are located in the interior of the object at a minimum spacing from the periphery of the object (in its depiction in the target image), while all other descriptor component values (i.e. those at positions of the background and positions closer to the periphery than the minimum spacing) are set to zero. This channel thereby provides a mask of the interior of the object. The descriptor component values can also change gradually from zero (from the periphery) to 1 (at the center of the object as depicted in the target image).

[1] [Translator's note: The original German sentence is garbled at this point; words are missing.]

The approach of FIG. 6 smooths the geometric target images at the edges, while the approach of FIG. 7 introduces an object mask (by replacing the descriptor component values of a channel or adding a channel).

A view-dependent target image can be calculated automatically by way of an object mask for a geometric target image.

Note, however, that the geometric target image does not need to be generated in order to generate a pertinent view-dependent target image. Especially in the case in which one channel serves for masking, as in the example of FIG. 7, the geometric target image having geometric descriptor component values (i.e. those that result from mapping the descriptors of the object vertices) does not need to be created for that channel.

The view-dependent image pertinent to a geometric target image can, however, also be generated by re-rendering the geometric target image (for example in the case of periphery blending as in the example of FIG. 6).

Note also that the periphery of the object in the target image can correspond to different points on the object depending on how the object is rotated in the target image. The descriptors of points on the object therefore depend on the view of the object, and are in that sense view-dependent.

Figure 8:
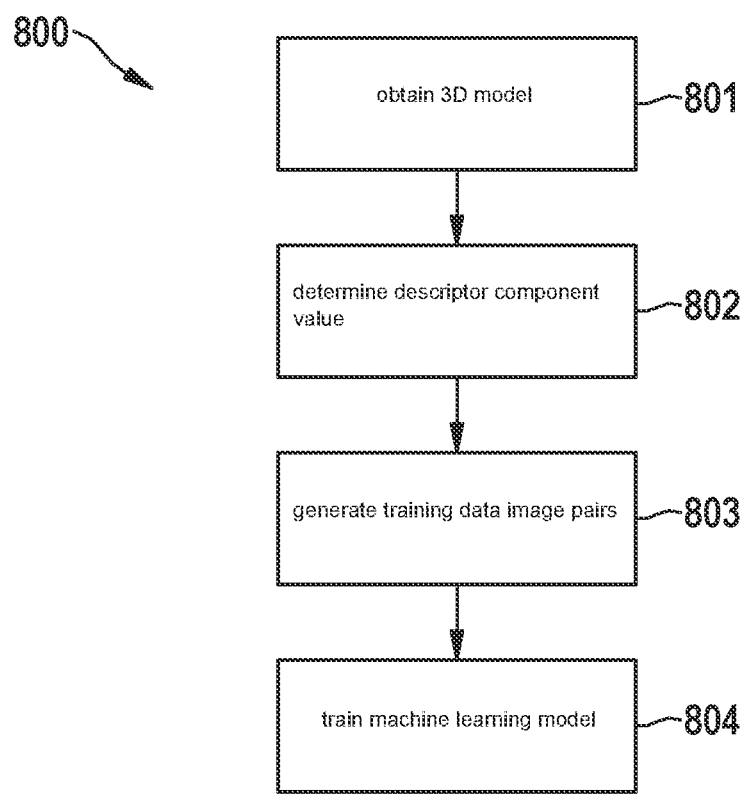
FIG. 8 shows a method for training a machine learning model to recognize an object topology of an object from an image of the object, in accordance with an embodiment of the present invention.

In summary, in accordance with various embodiments a method as illustrated in FIG. 8 is furnished.

FIG. 8 shows a method for training a machine learning model for recognizing an object topology of an object from an image of the object, in accordance with an embodiment.

In 801, a 3D model of the object is obtained, the 3D model encompassing a grid of vertices.

In 802, a descriptor component value is determined for each vertex of the grid.

In 803, training data image pairs are generated, each training data image pair encompassing a training input image showing the object and a target image, and the generation of the target image encompassing the following:
  determining the vertex positions of vertices of the object model of the object which the vertices have in the training input image;
  for each determined vertex position in the training input image, assigning the descriptor component value determined for the vertex at the vertex position to the position in the target image; and
  adapting at least some of the descriptor component values assigned to the positions in the target image or adding descriptor component values to the positions of the target image, so that descriptor component values that are assigned to positions inside the object and within a predefined spacing from the periphery of the object in the target image are adapted or added in such a way that they are located closer to descriptor component values that are assigned to positions outside the object than to descriptor component values that are assigned to positions in the interior of the object which are located farther than the predefined spacing from the periphery of the object.

In 804, the machine learning model is trained by monitored learning using the training data image pairs as training data.

In other words, in accordance with various embodiments, an object is embedded into a descriptor space and a training target image with respect to a training input image acquired by a camera is generated by projection onto the image plane of the camera. In addition, descriptor component values are adapted or added so that the peripheries of the object are less sharp in the target image (at least for one channel).

Note that the descriptor component values can be components of descriptor vectors. In the examples above the descriptors are, for instance, three-dimensional vectors whose first component is regarded e.g. as a red value, second component e.g. as a green value, and third component e.g. as a blue value, so that the target image is an RGB image.

The term "descriptor component value" used in conjunction with FIG. 8 can refer to one component, so that, for example, in the context of adaptation only the blue channel of descriptor vectors is adapted. The "descriptor component value of a component of a first vector" and the "descriptor component value of the component of a second vector" mean the "descriptor component value from the first vector" and the corresponding "descriptor component value from the second vector," i.e. the descriptor component value that belongs to the same dimension as that of the first vector, or has the same index or the same row number, when the descriptors are depicted as column vectors, as those of the first vector or, in the context of an interpretation as color values, belongs to the same color channel as the first vector.

While the machine learning network is described in the above examples as a neural network, other regressor types can be used to map a 3D tensor onto another 3D tensor.

In accordance with various embodiments, the machine learning model assigns descriptors to pixels of the object (in the image plane). This can be regarded as indirect encoding of the surface topology of the object. This connection between descriptors and the surface topology can be explicitly made by rendering, in order to map the descriptors onto the image plane. Note that descriptor component values on surfaces (i.e. points that are not vertices) of the object model can be determined by interpolation. For example, if a surface is defined by three vertices of the object model having their respective descriptor component values y1, y2, y3, then at any point on the surface the descriptor component value y can be calculated as a weighted sum of those values $w_1 \cdot y_1 + w_2 \cdot y_2 + w_3 \cdot y_3$. In other words, the descriptor component values at the vertices are interpolated.

In order to generate image pairs for training data, an image of the object (for example an RGB image) including the object (or several objects) is mapped using a known three-dimensional (e.g. CAD) model and a known placement (in a global coordinate system) onto a (dense) descriptor image that is generated by way of a search for descriptors to minimize the deviation of geometric properties (in particular the proximity of points of the object) between the object model and its representation (embedding) in the descriptor space. In practical use, the theoretically optimum solution for minimization generally will not be found, since the search is limited to a certain search space. An estimate of the minimum will nevertheless be determined within the limitations of a practical application (available calculation accuracy, maximum number of iterations, etc.).

Descriptors for the vertices are thus searched for by carrying out a process of minimizing the sum, over pairs of connected vertices, of distances between the descriptors of the pairs of vertices, weighted by the weight of the edge between the pair of vertices, a search being made for each descriptor for a respective vertex of the vertices.

Each training image pair encompasses a training input image of the object and a target image, the target image being generated by projecting the descriptors, visible in the training input image, of the vertices onto the training input image plane in accordance with the placement that the object has in the training input image. The descriptor values can then be further adapted as described above, or descriptor values are added as described above.

The images, together with their associated target images, are used for monitored training of the machine learning model.

The machine learning model is thus trained to recognize unique features of an object (or of several objects). This information can be used for a variety of applications in robot control by evaluating the machine learning model in real time, for example predicting an object grip placement for assembly. Note that the monitored training approach enables explicit encoding of symmetry information.

The method of FIG. 8 can be carried out by one or several computers that contain one or several data processing units. The expression "data processing unit" can be understood as any type of entity that enables the processing of data or signals. For example, the data or signals can be processed in accordance with at least one (i.e. one or more than one) specific function that is carried out by the data processing unit. A data processing unit can contain or be constituted by an analog circuit, a digital circuit, a mixed-signal circuit, a logic circuit, a microprocessor, a microcontroller, a central processing unit (CPU), a graphics processing unit (GPU), a digital signal processor (DSP), a field programmable gate array (FPGA), an integrated circuit, or any combination thereof. Any other manner of implementing the respective functions which is described in detail below can also be understood as a data processing unit or logic circuit assemblage. It is understood that one or several of the method steps described in detail herein can be executed (e.g. implemented) by a data processing unit by way of one or several specific functions carried out by the data processing unit.

The expression "robot" can be understood to refer to any physical system (having a mechanical part whose motion is controlled), for example a computer-controlled machine, a vehicle, a household appliance, a power tool, a personal assistant, or an access control system.

Various embodiments can receive and use sensor signals from a variety of sensors such as a (for example, RGB) camera, video, radar, lidar, ultrasound, thermal imaging technology, etc., for example in order to obtain sensor data that show an object. Embodiments can be used to generate training data and to train a machine learning system, for instance for autonomous control of a robot, for example a robot manipulator, to perform various manipulation tasks in various scenarios. Embodiments are applicable in particular to the control and monitoring of the performance of manipulation tasks, for example on assembly lines.

Although specific embodiments have been illustrated and described herein, one of average skill in the art should recognize that a plurality of alternative and/or equivalent implementations for the specific embodiments that are shown and described can be substituted without departing from the scope of protection of the present invention. The present invention and the disclosure herein is intended to cover any adaptations or variations of the specific embodiments discussed herein.

What is claimed is:

1. A method for training a machine learning model to recognize an object topology of an object from an image of the object, the method comprising the following steps:
    obtaining a 3D model of the object, the 3D model encompassing a grid of vertices;
    determining a descriptor component value for each vertex of the vertices of the grid;
    generating training data image pairs, each training data image pair of the training data image pairs encompassing a training input image showing the object, and a target image, and generating of the target image includes the following:
        determining vertex positions of the vertices of the 3D model of the object which the vertices of the 3D model of the object have in the training input image;
        assigning, for each determined vertex position in the training input image, the descriptor component value determined for the vertex at the vertex position to the position in the target image; and
        adapting at least some of the descriptor component values assigned to the positions in the target image or adding descriptor component values to the positions of the target image, so that descriptor component values that are assigned to positions inside the object and within a predefined spacing from a periphery of the object in the target image become adapted or added in such a way that they are located closer to descriptor component values that are assigned to positions outside the object than to descriptor component values that are assigned to positions in an interior of the object which are located farther than the predefined spacing from the periphery of the object; and
    training the machine learning model by monitored learning using the training data image pairs as training data.

2. The method as recited in claim 1, further comprising:
    determining a descriptor for each vertex of the vertices of the grid, the descriptors being vectors that have one vector component for each of a plurality of channels, and:
        descriptor component values of a channel being adapted so that descriptor component values of the channel which are assigned to positions inside the object and within a predefined spacing from the periphery of the object in the target image are adapted so that they are located closer to descriptor component values of the channel which are assigned to positions outside the object than to descriptor component values of the channel which are assigned to positions in the interior of the object which are located farther than the predefined spacing from the periphery of the object; and/or
        a channel having descriptor component values is added, so that descriptor component values of the added channel which are assigned to positions inside the object and within a predefined spacing from the periphery of the object in the target image are located closer to descriptor component values of the added channel which are assigned to positions outside the object than to descriptor component values of the added channel which are assigned to positions in the interior of the object which are located farther than the predefined spacing from the periphery of the object.

3. The method as recited in claim 2, wherein one channel of the plurality of channels is replaced by the added channel.

4. The method as recited in claim 2, wherein the descriptor component values of the added channel are selected so that they change monotonically when positions are cycled through from a position outside the object to a position at a center of the object.

5. The method as recited in claim 1, wherein descriptor component values are adapted in such a way that those of the descriptor component values that are assigned to positions within the predefined spacing inside the object, and those of the descriptor component values that are assigned to positions outside the object, are equalized.

6. The method as recited in claim 1, wherein the generating of the training data image pairs includes obtaining several images of the object in different respective placements, and generating a respective training data image pair from each obtained image by generating a target image for the obtained image.

7. The method as recited in claim 6, comprising determining the vertex positions of vertices of the 3D model of the object which the vertices have in the training input images, from the respective placements that the object has in the training input images.

8. The method as recited in claim 1, wherein the vertices of the 3D model are connected by edges, each edge of the edges having a weight that specifies a proximity of two vertices in the object which are connected by the edge, and the determining of the descriptor component value for each vertex of the vertices of the grid is accomplished by searching for descriptor component values for the vertices which minimize a sum, over pairs of connected vertices, of distances between the descriptor component values of the pair of vertices, weighted by the weight of the edge between the pair of vertices.

9. The method as recited in claim 8, wherein the searching for the descriptor component values includes: determining eigenvectors of a Laplacian matrix of a graph constituted by the vertices and the edges of the 3D model, and assuming components of the eigenvectors as the descriptor component values.

10. The method as recited in claim 9, further comprising:
associating each vertex of the vertices of the grid with a component position in the eigenvectors; and
assuming, for each vertex of the vertices of the grid, the components in the eigenvectors at the component position associated with the vertex as the descriptor component values for the vertex.

11. The method as recited in claim 10, wherein the determining of the descriptor component values further encompassing combining components of eigenvectors whose eigenvalues differ by less than a predetermined threshold into a single component.

12. The method as recited in claim 1, wherein the obtaining of the 3D model of the object includes: obtaining a 3D grid of vertices and edges that model the object, and assigning, as weights for the edges, edge weights of a Laplace-Beltrami operator that is applied to the grid.

13. A method for controlling a robot, comprising the following steps:
training a machine learning model to recognize an object topology of an object from an image of the object, including:
obtaining a 3D model of the object, the 3D model encompassing a grid of vertices;
determining a descriptor component value for each vertex of the vertices of the grid;
generating training data image pairs, each training data image pair of the training data image pairs encompassing a training input image showing the object, and a target image, and generating of the target image includes the following:
determining vertex positions of the vertices of the 3D model of the object which the vertices of the 3D model of the object have in the training input image;
assigning, for each determined vertex position in the training input image, the descriptor component value determined for the vertex at the vertex position to the position in the target image; and
adapting at least some of the descriptor component values assigned to the positions in the target image or adding descriptor component values to the positions of the target image, so that descriptor component values that are assigned to positions inside the object and within a predefined spacing from a periphery of the object in the target image become adapted or added in such a way that they are located closer to descriptor component values that are assigned to positions outside the object than to descriptor component values that are assigned to positions in an interior of the object which are located farther than the predefined spacing from the periphery of the object; and
training the machine learning model by monitored learning using the training data image pairs as training data;
obtaining an image showing the object;
introducing the image into the machine learning model;
determining a placement of the object from an output of the machine learning model; and
controlling the robot depending on the determined placement of the object.

14. The method as recited in claim 13, wherein the determining of the object placement includes determining a position of a certain part of the object, and wherein the controlling of the robot depending on the determined placement of the object includes controlling an end effector of the robot, moving to the position of the part of the object, and interacting with the part of the object.

15. A software or hardware agent, the agent being a robot, comprising:
a camera configured to furnish image data of an object;
a control system configured to implement a machine learning model; and
a training apparatus configured to train the machine learning model, the training apparatus configured to:
obtain a 3D model of the object, the 3D model encompassing a grid of vertices;
determine a descriptor component value for each vertex of the vertices of the grid;
generate training data image pairs, each training data image pair of the training data image pairs encompassing a training input image showing the object, and a target image, and the training apparatus configured to generate the target image by:

determining vertex positions of the vertices of the 3D model of the object which the vertices of the 3D model of the object have in the training input image;

assigning, for each determined vertex position in the training input image, the descriptor component value determined for the vertex at the vertex position to the position in the target image; and adapting at least some of the descriptor component values assigned to the positions in the target image or adding descriptor component values to the positions of the target image, so that descriptor component values that are assigned to positions inside the object and within a predefined spacing from a periphery of the object in the target image become adapted or added in such a way that they are located closer to descriptor component values that are assigned to positions outside the object than to descriptor component values that are assigned to positions in an interior of the object which are located farther than the predefined spacing from the periphery of the object; and train the machine learning model by monitored learning using the training data image pairs as training data.

16. The software or hardware agent as recited in claim 15, further comprising:

at least one actuator, the control system being configured to control the at least one actuator using an output from the machine learning model.

17. A non-transitory computer-readable medium that stores instructions for training a machine learning model to recognize an object topology of an object from an image of the object, the instructions, when executed by a processor, causing the processor to perform the following steps:

obtaining a 3D model of the object, the 3D model encompassing a grid of vertices;

determining a descriptor component value for each vertex of the vertices of the grid;

generating training data image pairs, each training data image pair of the training data image pairs encompassing a training input image showing the object, and a target image, and generating of the target image includes the following:

determining vertex positions of the vertices of the 3D model of the object which the vertices of the 3D model of the object have in the training input image;

assigning, for each determined vertex position in the training input image, the descriptor component value determined for the vertex at the vertex position to the position in the target image; and adapting at least some of the descriptor component values assigned to the positions in the target image or adding descriptor component values to the positions of the target image, so that descriptor component values that are assigned to positions inside the object and within a predefined spacing from a periphery of the object in the target image become adapted or added in such a way that they are located closer to descriptor component values that are assigned to positions outside the object than to descriptor component values that are assigned to positions in an interior of the object which are located farther than the predefined spacing from the periphery of the object; and training the machine learning model by monitored learning using the training data image pairs as training data.

* * * * *